Feb. 24, 1925. 1,527,482

A. HUGUENIN ET AL

ROTARY VALVE FOR PIPE LINES

Filed Feb. 26, 1923

Inventors:
Albert Huguenin
Anton Gagg
By [signature] atty.

Patented Feb. 24, 1925.

1,527,482

UNITED STATES PATENT OFFICE.

ALBERT HUGUENIN AND ANTON GAGG, OF ZURICH, SWITZERLAND, ASSIGNORS TO AKTIENGESELLSCHAFT DER MASCHINENFABRIKEN ESCHER WYSS & CIE., OF ZURICH, SWITZERLAND.

ROTARY VALVE FOR PIPE LINES.

Application filed February 26, 1923. Serial No. 621,386.

*To all whom it may concern:*

Be it known that we, ALBERT HUGUENIN and ANTON GAGG, citizens of the Republic of Switzerland, residing at Zurich, Switzerland, have invented certain new and useful Improvements in Rotary Valves for Pipe Lines, of which the following is a specification, reference being had therein to the accompanying drawing.

Rotary valves for pipe lines are known which are provided with a closing disc having a packing face and being movably arranged in the rotary gate body, the closing disc being pressed against a packing face arranged in the valve casing by the pressure in the pipe line. With valves of this type a very perfect packing is attained and the packing disc owing to its movability is enabled to adjust itself when resting on the corresponding packing face of the casing; however, they present the disadvantage that the total pressure acting upon the closing disc, which pressure may be very considerable, acts on the cooperating packing faces, whereby a displacement of said faces relatively to each other when opening or closing the valve is rendered difficult.

With the rotary valve according to the present invention this disadvantage is overcome by arranging a hollow space provided with a strongly throttled supply for the medium under pressure and with a comparatively large discharge pipe in front of the closing disc, so that the latter may totally or partially be relieved of the pressure present inside the pipe line by opening the discharge pipe. We thereby attain with an open discharge pipe that the pressure acting otherwise on the closing disc is wholly or partially taken up by the fulcrum pins of the rotary gate body. As these pins may easily be lubricated in contradistinction to the packing faces an efficient lubrication of which is scarcely possible, and as the radius of the cylindrical gliding faces of the pins is much smaller than that of the packing faces, the friction when opening or closing the valve is substantially smaller, and in order to actuate the rotary valve a much smaller force has to be exerted than is the case with the hitherto known valves of this type. A further advantage consists in the fact that owing to the absence of high pressures when the valve is opened or closed, the packing faces are subjected to a smaller wear and the danger of the destruction of the packing faces existing with high pressure pipe lines is overcome.

Several constructional examples of the rotary valve according to the invention are illustrated in the accompanying drawings, in which.

Similar parts are designated by similar reference numbers throughout the drawings.

Figure 1:
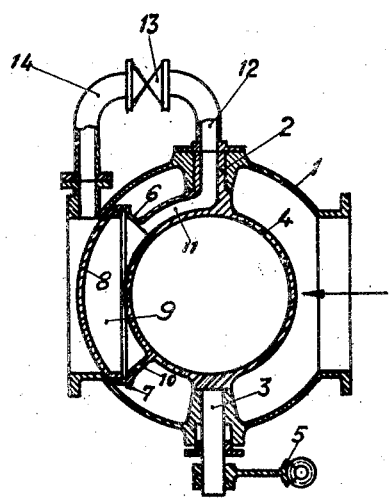
Fig. 1 is a section along the axis of rotation through the closed valve.

Within a spherical valve casing 1 the fulcrum pins 2 and 3 of the rotary gate body 4 are rotatably mounted. On the extension of the pin 3 a gear 5 is fixed by means of which rotation is imparted to the gate body 4. The latter is provided with a lateral extension 6 having a short cylindrical flange 7 in which the closing or packing disc 8 is movably arranged, as little clearance as possible being provided between flange 7 and closing plate 8. The hollow space 9 formed by the gate body 4 with an extension 6 and the closing disc 8 is on one side connected to the interior of the valve casing 1, which is filled with the medium under pressure, through a small opening 10 and on the other hand the hollow space 9 is connected by means of a channel 11 extending through the pin 2 with the discharge pipe 12. In the latter a shut-off device 13 is inserted serving to close the pipe 12 at will. 14 denotes a pipe by which the discharge pipe 12 is connected with the space behind the gate body.

Figure 2:
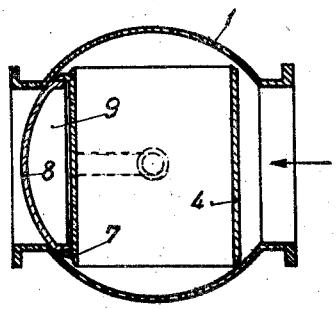
Fig. 2 is a section at right angles to the axis of rotation through the closed valve.
Figure 3:
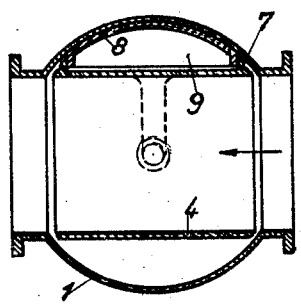
Fig. 3 is a section similar to that shown in Fig. 2 through the open valve.

The rotary valve illustrated in Figs. 1-3 is actuated as follows:

Let it be assumed that the gate body 4 is in its closed position illustrated in Figs. 1 and 2 and that the shut-off member 13 is closed. Now the closing disc 8 is pressed against the packing face of the valve casing 1 by the full pressure present inside this casing, as the space 9 is in open communication with the interior of the valve casing by means of the opening 10, whereby the disc 8 is tightly pressed against its seat. In order to open the valve, the shut-off member 13 is first opened whereby a communication between the space 9 and the space behind the gate body, which space is free of pressure, is established.

By dimensioning the pipes 12, 14 comparatively large in proportion to the opening 10 the comparatively small quantity of liquid under pressure passing through the opening 10 is so discharged through the pipes 12, 14 that only a small pressure is present in the space 9, the disc 8 being thus nearly completely relieved of any pressure. The pressure acting previously upon the packing faces between disc 8 and casing 1 is now taken up for the greatest part by the fulcrum pins 2 and 3, which can be readily lubricated, so that the gate body 4 can be turned readily into the open position illustrated in Fig. 3 by means of the gear 5.

In order to close the rotary valve the gate body 4 is turned back into the closed position shown in Fig. 2, the pipes 12 and 14 being thereby left open. When the body 4 is in the closed position, the shut-off member 13 is then closed so that the disc 8 is pressed tightly against the casing 1 under the influence of the pressure of the medium in the pipe line.

Figure 4:
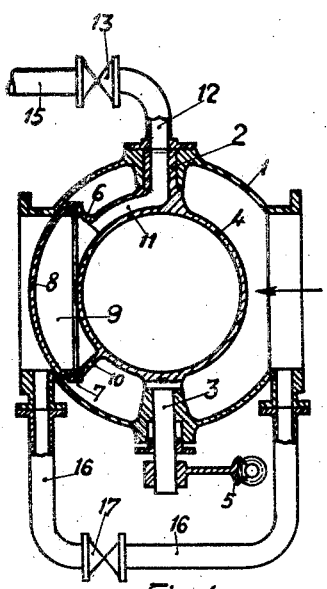
Fig. 4 is a section similar to that shown in Fig. 1 through a second constructional example.

For the purpose of not only relieving the disc 8 before the start of the opening movement of the gate body 4 but for even lifting the disc 8 off the packing face of the casing, the pipe 12 may, as is shown in Fig. 4, not be connected with the space behind the valve but with a separate discharge pipe 15 leading to the outside. As is illustrated in Fig. 4 the rotary valve is provided in this case with a by-pass conduit 16 having a cut-off member 17 by means of which by-pass the space at the rear of the valve may be filled and at least partly exposed to pressure before the gate body 4 is moved into the open position. If now the valve 13 is opened and the space 9 is now nearly completely relieved of the pressure, and if hereupon the space behind the valve 4 is subjected to pressure by opening the member 17, the disc 8 is lifted off its seat to an extent which is limited by the clearance between the cylindrical flange 7 and the disc 8.

Figure 5:
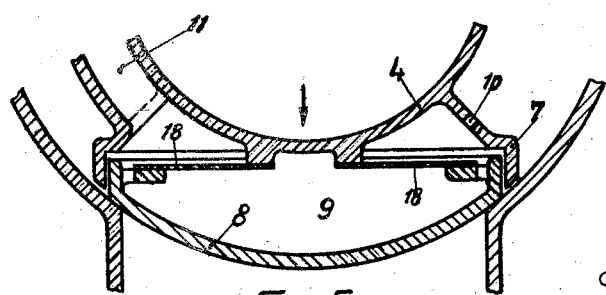
Fig. 5 shows on a larger scale another construction of the closing disc.

The lifting off of the closing disc 8 may also be attained by connecting it in the manner illustrated in Fig. 5 in a resilient manner to the gate body 4, so that upon an opening of the discharge pipe (which is not shown in Fig. 5) i. e. when only a slight pressure exists in the space 9, the disc 8 is lifted off its seat by the action of a spring. To this end a disc-shaped spring 18, as is shown in Fig. 5, may be provided, which is connected along its outer circumference with the disc 8 and in its centre part with the gate body 4 and which is tensioned when the disc 8 is pressed against the casing by the water pressure inside the pipe line.

We claim:

1. A rotary valve for pipe lines, comprising in combination a valve casing provided with a fixed seat, a gate body movable within said casing, journals on the gate body having their bearings in the valve casing, a closing member provided with a seat adapted to cooperate with the seat of the casing, said member being movable with and relatively to the gate body and confining together with the latter a hollow space, means allowing a supply of intensively throttled fluid to said space in order to press said member in the closing position against the seat of the casing, and separate means for relieving said space from pressure whilst said member is still in the closing position to cause the journals on the gate body to take up the whole pressure on said body.

2. A rotary valve for pipe lines, comprising in combination a valve casing provided with a fixed seat, a gate body movable within said casing, journals on the gate body having their bearings in the valve casing and arranged transversely of the passage through the body, a closing member provided with a seat adapted to cooperate with the seat of the casing, said member being movable with and relatively to the gate body and confining together with the latter a hollow space, means allowing a supply of intensively throttled fluid to said space in order to press said member in the closing position against the seat of the casing, a relatively large discharge pipe for relieving said space from pressure whilst said member is still in the closing position to cause the journals on the gate body to take up the whole pressure on said body, and a shut-off member provided in said discharge pipe.

3. A rotary valve for pipe lines, comprising in combination a valve casing provided with a fixed seat, a gate body movable within said casing, journals on the gate body having their bearings in the valve casing, a closing member provided with a seat adapted to cooperate with the seat of the casing, said member being movable with and relatively to the gate body and confining together with the latter a hollow space, means allowing a supply of intensively throttled fluid to said space in order to press said member in the closing position against the seat of the casing, means for relieving said space from pressure whilst said member is still in the closing position to cause the journals on the gate body to take up the whole pressure on said body, and a by-pass adapted to connect the upstream side of the valve to the downstream side.

4. A rotary valve for pipe lines, comprising in combination a valve casing provided with a fixed seat, a gate body movable within said casing, journals on the gate body having their bearings in the valve casing, a closing disc provided with a seat adapted to cooperate with the seat of the casing and confining together with the gate body a hollow space, resilient means connecting the closing disc to the gate body, means allowing a supply of intensively throttled fluid to said space, and means for relieving said space from pressure whilst said disc is still in the closing position to cause the journals of the gate body to take up the whole pressure on this body, said resilient means yielding in one direction upon the pressure of the fluid acting on the closing disc and lifting the latter away from the seat of the casing when said hollow space is relieved from pressure.

5. A rotary valve for pipe lines, comprising in combination a valve casing provided with a fixed seat, a gate body movable within said casing, journals on the gate body having their bearings in the valve casing, a closing disc provided with a seat adapted to cooperate with the seat of the casing and confining together with the gate body a hollow space, a plate spring connecting the closing disc to the gate body, means allowing a supply of intensively throttled fluid to said space, and means for relieving said space from pressure whilst said disc is still in the closing position to cause the journals of the gate body to take up the whole pressure on this body, said plate spring yielding in one direction upon the pressure of the fluid acting on the closing disc and lifting the latter away from the seat of the casing when said hollow space is relieved from pressure.

6. A rotary valve for pipe lines, comprising in combination a valve casing provided with a fixed seat, a gate body movable within said casing, journals on the gate body having their bearings in the valve casing, a closing member provided with a seat adapted to cooperate with the seat of the casing, said member being movable with and relatively to the gate body and confining together with the latter a hollow space, a narrow passage in said closing member for admitting intensively throttled fluid to said space in order to press said member in the closing position against the seat of the casing, and means for relieving said space from pressure whilst said member is still in the closing position to cause the journals on the gate body to take up the whole pressure on said body.

7. In a rotary valve, a casing, an open-ended cylindrical gate body in said casing, journals mounted on the exterior of said body and having bearings in the casing, a valve member carried on a side of said body and held to its seat by pipe line pressure, and means to cause a shifting of the pipe line pressure load from said member to said journals.

8. In a rotary valve, a casing, a gate body therein, journals for said body, a valve carried by and movable with respect to said body and under hydraulic pressure when in closed position, and means to permit the transfer of the full hydraulic pressure, when the valve is in closed position, from the valve to the gate body and journals, preparatory to opening the valve.

9. In a rotary valve, a casing, a journalled gate body therein, a closing member carried by said gate body and confining together with the latter a hollow space vented to the pressure side, and separate adjustable means to relieve the pressure on the closing member preparatory to operating the same.

10. In a rotary valve, a casing, a gate body journaled therein, a movable valve member carried thereby and vented to the pressure side, and means connecting the interior of the valve through a journal to the exterior of the casing to relieve the hydraulic pressure on the valve.

11. In a rotary valve, a casing, a gate body therein, a valve member movably supported on the body, means to admit liquid between the member and body, means to permit the discharge of liquid from between the valve and gate in a greater volume than the inflow through said admission means.

12. In a rotary valve, a casing, a gate body therein, a valve member movably supported on the body, means to admit liquid between the member and body, means to permit the discharge of liquid from between the valve and gate in a greater volume than the inflow through said admission means, and means to by-pass the valve and gate body.

13. In a rotary valve, a casing, a gate body therein, a valve member movably supported on the body, means to admit liquid between the member and body, means to permit the discharge of liquid at the axis of movement of the gate between the valve and gate in a greater volume than the inflow through said admission means.

14. In a rotary valve, a spherical casing, a tubular gate therein, trunnions on said gate at its minor axis, a valve member carried by the gate between said gate and casing and movable with respect to the gate, means to admit liquid between the valve member and gate, and separate means to discharge said liquid to the conduit on the discharge side of the valve.

15. In a rotary valve, a casing, a tubular gate therein, journals on the gate perpendicular to the axis of the tube thereof, a spring retracted valve member carried by said gate, means to admit fluid to the valve to urge it to its seat against the action of its spring and means to relieve the pressure of fluid on the valve.

16. In a rotary valve, a casing, a tubular gate therein, a spring retracted valve member carried by said gate, means to permit liquid to force the member to its seat, and a discharge conduit of greater capacity than said means to relieve the pressure on said valve and thereby permit it to be retracted by its spring preparatory to operating the member.

In testimony whereof we affix our signatures.

ALBERT HUGUENIN.
ANTON GAGG.